United States Patent
Gohle et al.

(10) Patent No.: US 8,016,123 B2
(45) Date of Patent: Sep. 13, 2011

(54) FILTER ELEMENT WITH ACTIVE CARBON COATING

(75) Inventors: Angelika Gohle, Schwegenheim (DE); Manfred Tumbrink, Bad König (DE)

(73) Assignee: Mann & Hummel GmbH, Ludwigsburg (DE)

(*) Notice: Subject to any disclaimer, the term of this patent is extended or adjusted under 35 U.S.C. 154(b) by 820 days.

(21) Appl. No.: 11/954,445

(22) Filed: Dec. 12, 2007

(65) Prior Publication Data

US 2009/0261032 A1    Oct. 22, 2009

(30) Foreign Application Priority Data

Dec. 12, 2006  (DE) .................. 20 2006 018 863 U

(51) Int. Cl.
  *B01D 29/21* (2006.01)
  *B01D 53/04* (2006.01)
(52) U.S. Cl. .................. 210/489; 210/493.5; 210/502.1; 55/521; 55/523; 55/497
(58) Field of Classification Search .................. 55/521, 55/523, 497; 210/489, 490, 493.1, 493.5, 210/502.1; 96/135, 154
See application file for complete search history.

(56) References Cited

U.S. PATENT DOCUMENTS

| | | | | |
|---|---|---|---|---|
| 6,228,152 | B1* | 5/2001 | Guerin et al. ................... | 96/135 |
| 6,274,041 | B1* | 8/2001 | Williamson et al. .......... | 210/243 |
| 6,375,699 | B1* | 4/2002 | Beck ................................ | 55/497 |
| 6,550,622 | B2* | 4/2003 | Koslow .......................... | 210/490 |
| 7,063,733 | B2* | 6/2006 | Mori et al. ...................... | 96/135 |
| 2003/0226792 | A1* | 12/2003 | Tumbrink et al. ............. | 210/168 |
| 2006/0096910 | A1* | 5/2006 | Brownstein et al. .......... | 210/490 |

FOREIGN PATENT DOCUMENTS

EP    960645 A2 * 12/1999

* cited by examiner

*Primary Examiner* — Terry K Cecil

(57) ABSTRACT

A filter element has a first filter layer that has an active carbon layer, a top cover layer connected to the active carbon layer and a bottom cover layer connected to the active carbon layer opposite the top cover layer, wherein the first filter layer is folded to a first bellows. At least one second filter layer having an active carbon layer, a top cover layer connected to the active carbon layer and a bottom cover layer connected to the active carbon layer opposite the top cover layer is provided. The at least one second filter layer is folded to a second bellows. The first and second bellows are folded identically. The at least one second filter layer is arranged on the first filter layer in a positive-locking way by fold alignment of the first and second bellows to form a composite of filter layers.

10 Claims, 2 Drawing Sheets

FILTER ELEMENT WITH ACTIVE CARBON COATING

BACKGROUND OF THE INVENTION

The invention concerns a filter element with an active carbon layer that is connected to a top cover layer and to a bottom cover layer to form a filter layer.

EP 0 960 645 A2 discloses different filter media that are combined in a layered construction to a filter element. Included is also, for example, a filter medium that has an active carbon layer with a non-woven layer adjoining its top side and a layer of fine fiber non-woven material (melt blown) adjoining its bottom side.

SUMMARY OF THE INVENTION

The object of the invention is to provide a filter element that, while having a simple configuration, ensures a high adsorption capacity. This object is solved by a filter element of the aforementioned kind wherein the filter layer is folded to form a bellows, wherein at least one additional filter layer is provided that is also folded to form a bellows and that comprises an active carbon layer with a top cover layer and bottom cover layer, wherein the at least one additional filter layer is arranged on the filter layer in a positive-locking way by means of fold alignment of the bellows.

The filter layers that are positive-lockingly connected by being stacked in fold alignment of the filter bellows and comprised of several layers of filter medium result in a filter element that can be produced with minimal expenditure and that moreover has an excellent degree of separation. The dimensions of the filter element thus almost stay the same while the filter efficiency is improved significantly. The filtration efficiency can be predetermined by the number of employed filter layers so that a variability with regard to the degree of separation is present and, in this way, the pressure difference between the so-called raw side and the so-called clean side of the filter element can be determined also.

A first embodiment provides that in the filter element only the uppermost cover layer of the composite of filter layers is provided with a filter medium, in particular filter paper, so that a beneficial particle filtration, for example, dust filtration, and, secondarily, an adsorption of pollutants from the air to be cleaned by means of active carbon or other absorbent media is realized.

In an advantageous embodiment it is provided that in the filter element the upper cover layers in the composite of filter layers are comprised of filter medium so that in an efficient way a multi-stage particle filtration and a multi-stage pollutant adsorption are provided.

In particular, it is advantageous that in the filter element all cover layers of each individual filter layer are comprised of filter medium so that the degree of separation for the particle filtration can be increased in a simple way.

In an advantageous embodiment it is provided that all cover layers of each individual filter element are made of non-woven material so that in particular the demands in regard to application in a clean room are taken into account.

Advantageously, in the filter element the active carbon layer is glued to the cover layers, respectively, so that upon reshaping of the element the active carbon particles remain in their position, for example, even in the area of a bend.

In particular, it is advantageous that in the filter element the proportion of the adhesive is <2%, in particular <1%, of the entire volume of the active carbon layer so that for a sufficient adhesion of the active carbon particles on the cover layers a pressure loss as minimal as possible between the raw side and the clean side is obtained.

In an advantageous embodiment it is provided that in the filter element the filter layers are zigzag-shaped or meander-shaped so that different shapes of the filter layers, depending on the application, can be realized.

Advantageously, the filter element is designed such that the at least two filter layers are connected to one another at least at two opposed end faces, in particular, by means of a lateral non-woven. In this way, on the one hand, initially open sides of the filter layers are seal-tightly closed off and, on the other hand, the filter layers, depending on the stiffness of the non-woven, retain their flexibility which property is mandatory for mounting the filter element in a curved filter housing.

In an advantageous embodiment it is provided that in the mounted state of the filter element in a filter housing at least one of the lateral non-wovens takes over a sealing function, for example, relative to the lid of the filter housing, so that the lateral non-woven has a double function.

BRIEF DESCRIPTION OF THE DRAWINGS

The invention will be explained in the following with reference to the drawing in more detail. It is shown in.

EMBODIMENT(S) OF THE INVENTION

Figure 1:
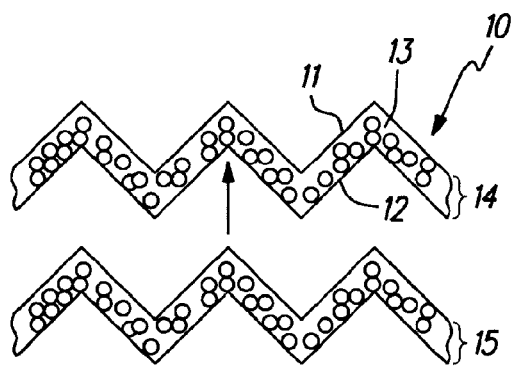
FIG. 1 shows in a section view a first and a second filter layers of a three-layered construction, respectively, before assembly.

In FIG. 1, one embodiment of the filter element 10 is illustrated in which a first zigzag-shaped cover layer 11 and a second zigzag-shaped cover layer 12 surround a layer of active carbon particles 13. The active carbon particles 13 arranged in a layer are glued to the two layers 11, 12. The proportion of adhesive is selected to be so minimal that the active carbon particles 13 adhere with sufficient strength to the cover layers 11, 12 but a pressure loss as minimal as possible between the raw side and the clean side will be caused. The proportion of adhesive relative to the total volume of the active carbon layer 13 is in this connection <1-2%.

Figure 2:
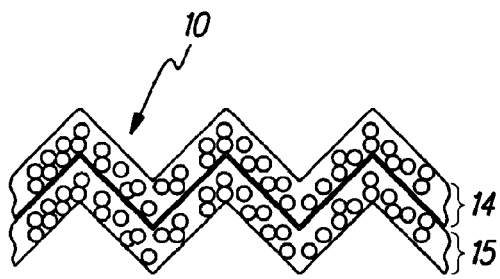
FIG. 2 shows a filter element according to the invention, shown in a section illustration, after assembly of the two filter layers of FIG. 1.
Figure 3:
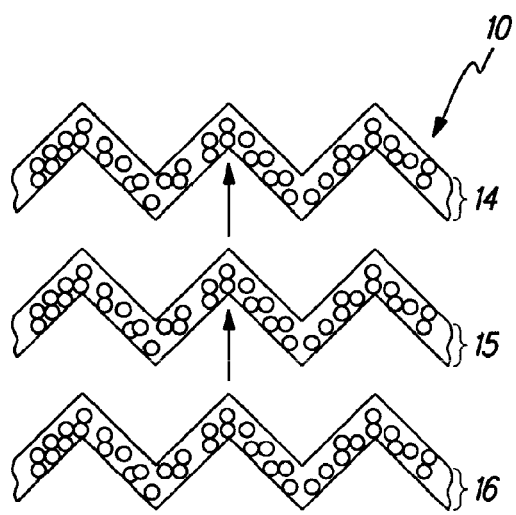
FIG. 3 shows in a section view a first, a second, and a third filter layers of a three-layered construction, respectively, before assembly in a section view.
Figure 4:
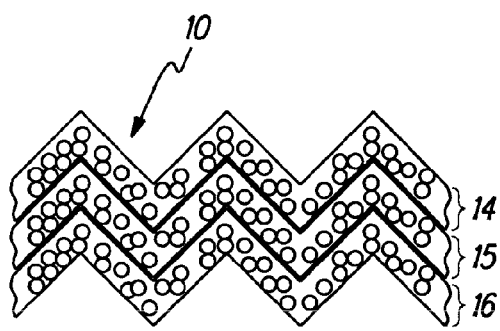
FIG. 4 shows a filter element according to the invention, shown in a section illustration, after assembly of the three filter layers of FIG. 3.

The layered composite 11-13 results in a first filter layer 14. By means of a further filter layer 15 of the same configuration that is matched to the shape of the first filter layer 14, the filter layer composite 14, 15 according to FIG. 2 results; it can be expanded as needed with additional filter layers 16 according to FIGS. 3 and 4.

With a positionally identical folding or pleating of each individual filter layer 14-16 filter bellows are provided that when stacked generate a positive-locking overall structure of the filter element 10.

Figure 5:
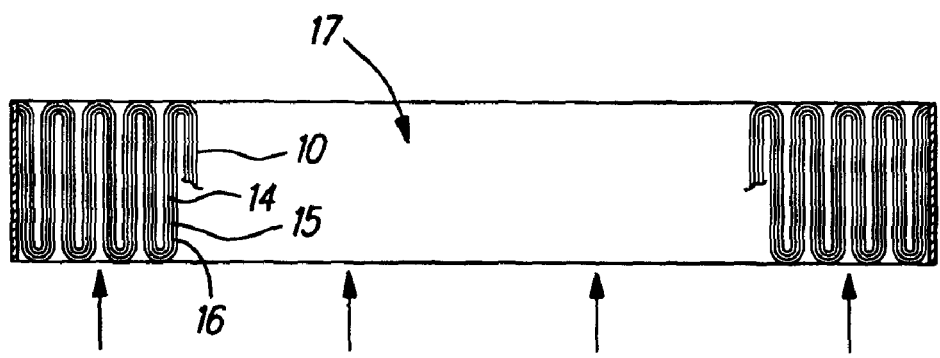
FIG. 5 shows the filter element of FIG. 4 folded to a meander shape.
Figure 6:
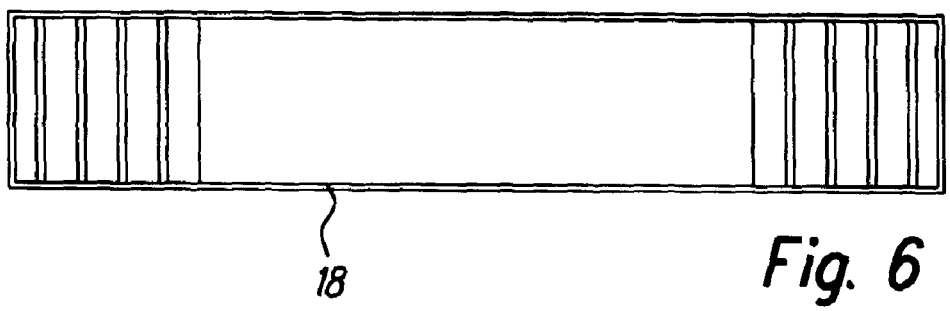
FIG. 6 shows a lateral non-woven that is sized so as to match the meander-shaped filter element illustrated in FIG. 5.

In contrast to a unitary tall filter layer, separate stacked filter layers 14-16 are utilized that are not connected or glued areally with one another but are connected to one another on at least two opposite end faces by means of a lateral non-woven or an adhesive strip. According to FIG. 5, the stacked filter layers 14-16 are pleated in a meander shape and can be closed off at the open profile sides 17 by means of a lateral non-woven 18 matched in regard to height and length in accordance with FIG. 6. A lateral non-woven that surrounds circumferentially all four sides of the filter element 10 is also conceivable. The incoming air enters the filter element 10 in accordance with FIG. 5 at the bottom side.

The multilayer configuration of the filter media 14-16 connected only at its edge areas makes it possible that the individual filter layers 14-16 can be provided with inner bending radii in a meander shape or zigzag shape so that the desired fold shape can be achieved. In contrast to this, a unit of several layers of filter media areally connected to one another and having a tall configuration as well as a unitary tall filter medium would allow only very small inner bending radii. Therefore, it would not be possible to produce the desired fold shape or it would be possible to produce it only unsatisfactorily.

The invention can be summarized as follows. In order to provide a filter element 10 that ensures with a simple configuration a high adsorption efficiency it is proposed to provide a first filter layer 14 of a three-layer configuration comprised of a top cover layer 11, an active carbon layer 13, and a bottom cover layer 12 which filter layer is then folded to a bellows and to arrange it in an interactive way with at least one additional three-layer filter layer 15 that is also folded to a bellows, wherein the at least one additional filter layer 15 is arranged on the first filter layer 14 in a positive-locking way by means of alignment of the folds of the bellows.

Preferred filter layer configurations will be explained with the following examples.

Example 1

The support layer (bottom cover layer) is comprised of polyester material. The active carbon layer is applied to this polyester material and the active carbon layer is covered by a melt-blown material, in particular, polycarbonate, as a top cover layer for particle filtration. The complete configuration has a weight per unit area of 400-600 g/m². The thickness is 1-2 mm, preferably 1-6 mm. The air permeability is >1,000 l/(m²s) for a differential pressure of 200 Pa.

Example 2

Figure 7:
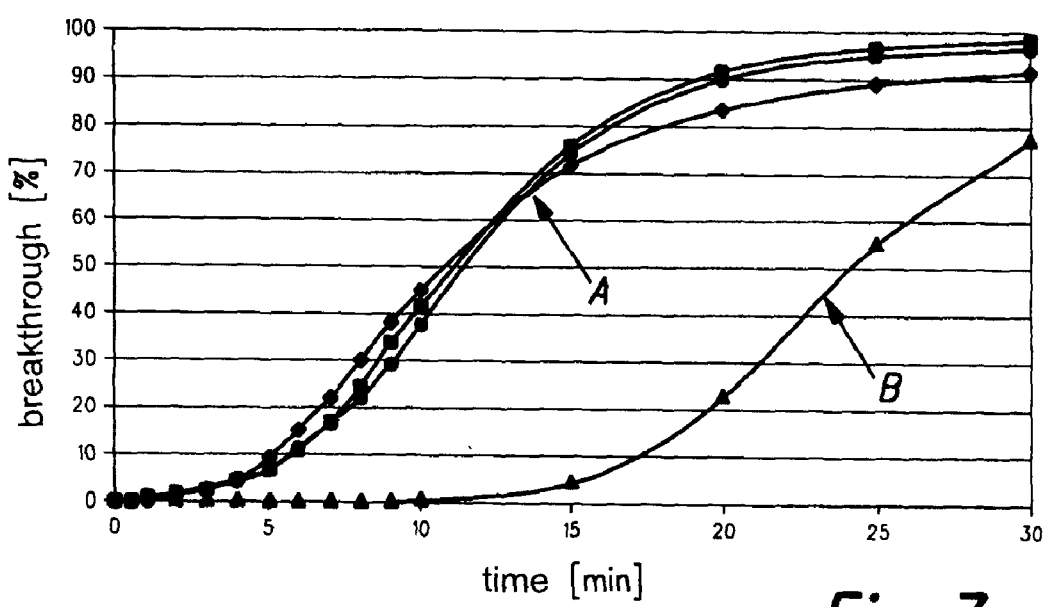
FIG. 7 illustrates breakthrough tendencies of a filter element according to the invention (curve B) in comparison to conventional active carbon filter media (curve A).

The support layer (bottom cover layer) is comprised of polyester non-woven material with 10-30 g/m². Onto this support layer an active carbon layer is arranged without impregnation. The top cover layer is comprised of polyester non-woven with polycarbonate melt-blown material for particle filtration and has a weight per unit area of 40-60 g/m². The air permeability of the entire configuration at a pressure of 200 Pa is between 800 and 1,200 l/(m²s). The total weight is 600-800 g/m². The weight of the active carbon is 500-650 g/m². The total thickness is at 2-2.5 m. The advantage of the claimed filtration configuration resides in the minimal breakthrough tendency and the high adsorption efficiency. Reference is being had to FIG. 7 in regard to breakthrough tendency. In this Figure the breakthrough curves of certain gases according to the method ASAE S525-2 is illustrated; the curve A shows conventional active carbon filter media while the curve B illustrates the breakthrough behavior of the claimed filter layers. It can be seen that the adsorption performance of the disclosed configuration is significantly higher and in particular the beginning of breakthrough can be stretched significantly over time.

In a preferred embodiment the active carbon layer has a weight in a range of 200-800 g/m², preferably 500-600 g/m² and has a cover layer comprised of polyester non-woven material with 10-50 g/m² weight per unit area. In another preferred embodiment, the cover layer is comprised of polyester and non-woven polycarbonate melt-blown material and has a weight per unit area of 10-100 g/m², preferably 40-60 g/m².

What is claimed is:

1. A filter element comprising:
a first filter layer comprising
an active carbon layer of active carbon particles,
a top cover layer connected to the active carbon layer and
a bottom cover layer connected to the active carbon layer opposite the top cover layer,
wherein the first filter layer is folded to a first bellows;
at least one second filter layer comprising
an active carbon layer of active carbon particles,
a top cover layer connected to the active carbon layer and
a bottom cover layer connected to the active carbon layer opposite the top cover layer,
wherein the at least one second filter layer is folded to a second bellows,
wherein the first and second bellows are folded identically;
wherein the at least one second filter layer is arranged on the first filter layer in a positive-locking way by fold alignment of the first and second bellows to form a composite of filter layers,
wherein only an uppermost one of the top and bottom cover layers of the composite of filter layers is provided with a filter medium, and
wherein the filter medium is filter paper.

2. The filter element according to claim 1, wherein the top and bottom cover layers of the first and the at least one second filter layers are provided with a non-woven.

3. The filter element according to claim 1, wherein the active carbon layers of the first and the at least one second filter layers are glued by an adhesive to the top and bottom cover layers, respectively.

4. The filter element according to claim 3, wherein the adhesive is present in a proportion of <2% of a total volume of the active carbon layers, respectively.

5. The filter element according to claim 3, wherein the adhesive is present in a proportion of <1% of a total volume of the active carbon layers, respectively.

6. The filter element according to claim 1, wherein the first and the at least one second filter layers are permanently connected to one another at least at two opposing end faces of the filter element by a lateral non-woven closing off said at least two opposing end faces while retaining flexibility of the filter layers.

7. The filter element according to claim 1, wherein
the active carbon layers of the first and the at least one second filter layers each have a weight in a range of 200-800 g/m² and
wherein the cover layers are comprised of polyester non-woven material with 10-50 g/m² weight per unit area.

8. The filter element according to claim 7, wherein the active carbon layers of the first and the at least one second filter layers each have a weight in a range of 500-600 g/m².

9. The filter element according to claim 1, wherein the cover layers of the first and the at least one second filter layers are comprised of polyester and non-woven polycarbonate melt-blown material and have a weight per unit area of 10-100 g/m².

10. The filter element according to claim 9, wherein the weight per unit area is 40-60 g/m².

* * * * *